United States Patent
Zuevsky

(10) Patent No.: US 9,774,512 B1
(45) Date of Patent: *Sep. 26, 2017

(54) MEASURING SERVER AVAILABILITY AND MANAGING TRAFFIC IN ADAPTIVE BITRATE MEDIA DELIVERY

(71) Applicant: Introspec LTD, London (GB)

(72) Inventor: Vitaly Zuevsky, London (GB)

(73) Assignee: INTROSPEC LTD, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,839

(22) Filed: Nov. 9, 2016

Related U.S. Application Data

(63) Continuation-in-part of application No. 14/794,303, filed on Jul. 8, 2015, now Pat. No. 9,525,713.

(51) Int. Cl.
*H04L 12/26* (2006.01)
*H04L 12/835* (2013.01)
*H04L 12/28* (2006.01)

(52) U.S. Cl.
CPC .......... *H04L 43/0817* (2013.01); *H04L 43/16* (2013.01); *H04L 47/30* (2013.01); *H04L 12/28* (2013.01)

(58) Field of Classification Search
CPC ...................................................... H04L 12/28
See application file for complete search history.

(56) References Cited

U.S. PATENT DOCUMENTS

| | | | |
|---|---|---|---|
| 5,774,668 A | 6/1998 | Choquier et al. | |
| 6,128,279 A | 10/2000 | O'Neil et al. | |
| 6,351,775 B1 | 2/2002 | Yu | |
| 6,480,936 B1 | 11/2002 | Ban et al. | |
| 8,078,755 B1 | 12/2011 | Liu et al. | |
| 8,392,611 B2 | 3/2013 | Leighton et al. | |
| 2005/0262246 A1 | 11/2005 | Menon et al. | |
| 2008/0031267 A1 | 2/2008 | Imao et al. | |
| 2010/0250742 A1 | 9/2010 | Leighton et al. | |
| 2015/0058404 A1 | 2/2015 | Agrawal et al. | |

FOREIGN PATENT DOCUMENTS

WO  WO 2012/091694 A1  7/2012

OTHER PUBLICATIONS

Economou, "How Akamai Maps the net: An Industry Perspective," The Next Wave, vol. 18, No. 3, pp. 8-15 (2010).

(Continued)

*Primary Examiner* — Adnan Mirza
(74) *Attorney, Agent, or Firm* — K&L Gates LLP

(57) ABSTRACT

Computer-based systems and methods measure saturation of a media server that transmits media content to a plurality of users via data links. The data buffers of the media server are sampled to ascertain whether they contain data to be transmitted to each buffer's associated destination at the time of the sampling. A saturation score is calculated based on the sampling, such as based on the number of non-empty data buffers. This saturation score can be used in routing new connection requests for the media server. The media server's saturation score can be compared to a threshold saturation score for the media server, with the difference between the scores indicating a present available bandwidth of the data links of the media serve. This process can be repeated periodically so that the saturation score of the media server is continuously updated.

19 Claims, 5 Drawing Sheets

(56) References Cited

OTHER PUBLICATIONS

Sharifian, "A Content-Based Load Balancing Algorithm with Admission Control for Cluster Web Servers," Future Generation Computer Systems 24, pp. 775-787 (2008) www.elsevier.com/locate/fgcs.
Alzoubi, "A Practical Architecture for an Anycast CDN," AMC Transactions on the Web, vol. 5, No, 4, Article 17 (2011).
Riiser, "Adaptive Bitrate Video Streaming Over HTTP in Mobile Wireless Networks," Faculty of Mathematics and Natural Sciences, University of Oslo, No. 1372, ISSN 1501-7710 (2013).
Aversa, "Load Balancing a Cluster of Web Servers Using Distributed Packet Rewriting," Computer Science Department, Boston University, 0-7803-5979-8/00, IEEE, pp. 24-29 (2000).
Ge, "A Demand Adaptive and Locality Aware (DALA) Streaming Media Server Cluster Architecture," Department of Computer Science, University of Massachusetts, NOSSDAV'02, May 12-14, 2002, ACM 1-58113-512-2/02/0005, pp. 139-146 (2002).
RGB Networks, "Comparing Adaptive HTTP Streaming Technologies, A Comparison of Apple's HTTP Live Streaming (HLS), Microsoft's Silverlight Smooth Streaming (MSS) and Adobe's HTTP Dynamic Streaming (HDS)," 2011.
Bommaiah, "Design and Implementation of a Caching System for Streaming Media over the Internet," Bell Laboratories, 0-7695-0713-1/00, IEEE (2000).
Combined Search and Examination Report for GB Application No. 1611444.9, dated Dec. 30, 2016 (6 pages).

US 9,774,512 B1

MEASURING SERVER AVAILABILITY AND MANAGING TRAFFIC IN ADAPTIVE BITRATE MEDIA DELIVERY

PRIORITY CLAIM

The present application claims priority as a continuation-in-part of U.S. patent application Ser. No. 14/794,303, filed Jul. 8, 2015, which is incorporated herein by reference.

BACKGROUND

Media servers deliver media content (video or audio) over digital data links to end-user devices that play the media, such as smartphones, tablets, laptops, PCs, and TV sets. A recurring issue arises when many end-users request content from one of the media servers, and this particular media server becomes a bottleneck for the data being sent to the user devices. For example, a caching media server can be connected to Internet at a bandwidth of 10 Gbps. Assume the server stores video assets encoded at a bitrate of 5 Mbps and has a transmission overhead of 10%. In this example, at most 1800 user devices can be served by this media server at a time (5 Mbps×1800 is 9 Gbps is 90% of 10 Gbps). If more devices requested the media assets, delivery bitrate would have to drop below 5 Mbps due to the bandwidth saturation at the sending side, such that all the users might face inappropriate playback quality, even though their own access to the Internet may be at higher speeds—much greater than the encoding rate.

The problem is further complicated by the fact that data for all user devices are not transmitted continuously. Many adaptive bitrate streaming technologies (including of Apple HLS®, Adobe HDS®, and Microsoft Smooth®) package content in multiple chunks that are requested irregularly. Also, the end user may not request the data continuously. Instead, the data transmissions are subject to the users' behavior, which may include pausing, fast-forwarding and rewinding the media at various times. Still further, accounting for user devices is complicated since with stateful protocols, such as TCP, a single user can use many connections.

One known mechanism to address these problems is to compare the actual bandwidth occupied on a network interface to the maximal bandwidth the interface was capable of. If the difference was less than some threshold the interface was deemed to be saturated. However, a handful of user devices with fast network connectivity can easily saturate any network interface this way, resulting in severe underuse of an operator's infrastructure. Another known technique is to monitor the number of established TCP connections at the server. If the measured number was greater than a threshold the server was deemed to be saturated. As explained above, however, connections alone cannot reliably indicate number of associated user devices, nor do those connections carry data continuously. This technique can, therefore, lead to drops in quality of service (QoS) as perceived by the user or underuse of the operator's infrastructure. Another known technique is to identify a user by a unique token within a URI when the content was requested over the HTTP(S) protocol. If the current number of such users exceeded a certain threshold the server was deemed to be saturated. Again, no user activity is taken into account with this technique. Besides, complexity of ongoing cross-protocol analysis requires some overheads. This technique complicates system architecture and does not offer a guarantee of sufficient bandwidth at the media server.

SUMMARY

When data are being sent over a physical link by a media server that serves media content, such as video or audio, the data are first copied into a random access memory (RAM) buffer of the media server associated with the destination, such as a socket buffer, before being physically sent out. An instantaneous count of the non-empty buffers of the media server represents the number of concurrent data transmissions at that specific point in time. Adequately, a sequential count of the non-empty buffers of the media server constitutes the average number of concurrent data transmissions over the time period the count was obtained within. This average number of concurrent transmissions indicates the available bandwidth of the data links of the media server and can be used to determine how to route new connection requests for media content so that, no matter how irregular transmissions on a single connection are, bandwidth per connection at the sender can be determined and maintained.

In one general aspect, therefore, the present invention is directed to computer-based systems and methods for measuring saturation of a media server that transmits media content to a plurality of users via data links. Data buffers of the media server are sampled to ascertain whether they contain data to be transmitted to each buffer's associated destination at the time of the sampling. A saturation score can be calculated based on the sampling, such as based on the number of non-empty data buffers. This saturation score can be used in routing new connection (or "socket") requests for the media server. For example, the media server's saturation score can be compared to a threshold saturation score for the media server, with the difference between the scores indicating a present available bandwidth of the data links of the media serve. For example, the media server is in a position to accept new connection requests when its saturation score is below the threshold, and conversely cannot accept new connection requests when the saturation score is at or above the threshold while still maintaining its bandwidth guarantee. This process can be repeated periodically so that the saturation score of the media server is continuously updated.

These and other benefits of the present invention will be apparent from the description that follows.

FIGURES

Various embodiments of the present invention are described herein by way of example in connection with the following figures, wherein.

DESCRIPTION

Figure 1:
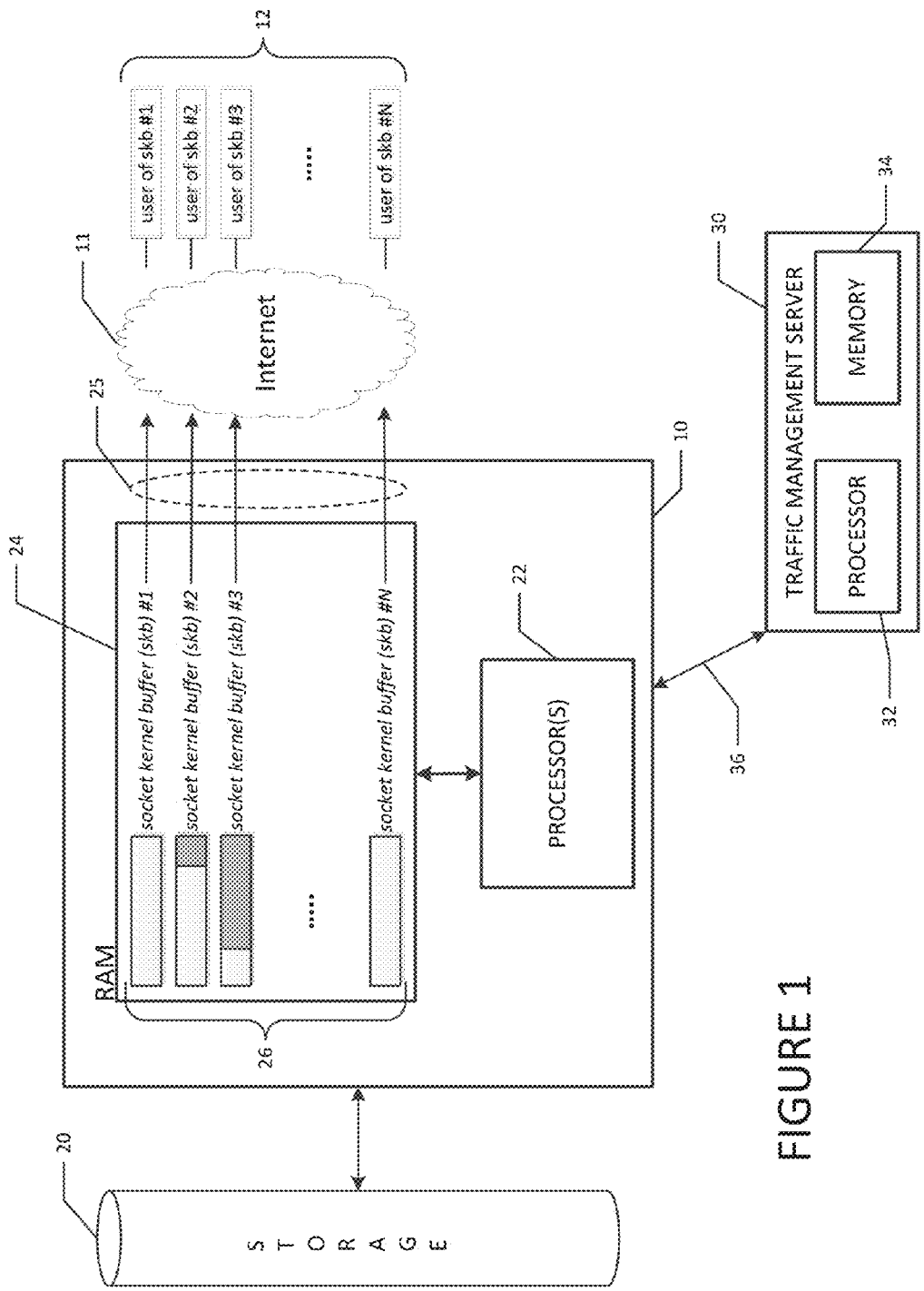
FIG. 1 is block diagram of media server that determines its saturation level according to various embodiments of the present invention.

FIG. 1 is a diagram of a media server 10 that delivers (e.g., streams) media content (video or audio) via a data communication network 11 (e.g., the Internet) to end users at end user devices 12 that are capable of playing the media. The media server 10 might be part of a data center that, for example, delivers media content stored at a data storage system 20 to the end users 12. The data storage system 20 may comprise magnetic, optical or semiconductor data storage. For example, the data storage system 20 may comprise one or more hard disk drives, solid state drives, optical storage devices, magnetic tape drives, etc. The data storage system 20 may be external to the media server 10 as shown in FIG. 1, although in other embodiments the data storage system could be internal to the media server 10. The end user devices 12 may be, for example, smartphones, tablets, laptops, PCs, TV sets, or any other processor-based device capable of receiving and playing the media content.

As shown in FIG. 1 the media server 10 includes at least one processor 22 and random access memory (RAM) 24. The media server 10 also comprises physical layer (PHY) data links 25 that connect the media server 10 to the network 11. The data links 25 can include one or more network adapters, network interface cards, network interface controllers, and/or any other suitable hardware that connects the media server 10 to the network 11. When an end user 12 connects to the media server 10 via the network 11 (such as with an Internet Protocol (IP) connection) and requests media from the media server 10, a data buffer 26 is allocated in the RAM 24 of the media server 10 to the user. FIG. 1 shows a quantity of N data buffers 26, one for each of the N end users 12. For example, the data buffers may be "socket send buffers" residing in the memory address space of the operating system (OS), known as the kernel. Where the media server 10 uses a Linux operating system, such a data buffer is sometimes also referred to as a socket kernel buffer (skb). When an end user 12 requests certain media content, the data for the media content can be retrieved from the data storage system 20 and stored (buffered) in the data buffer 26 associated with the end user that requested the media. Then the data in the buffer 26 is transmitted to the end user 12 via the network 11. The different shades for the data buffers 26 in FIG. 1 indicate that at a particular time, the data buffers may contain varying amounts of data, ranging from 0% to 100% of the buffer's capacity. That is, a particular buffer is getting filled with data being copied from the data storage system 20 while concurrently being emptied as it transmits the data to the destination end user 12. When a data buffer 26 is empty at a particular time, it is not transmitting data to its associated end user; when the data buffer is not empty at a particular time, it is transmitting data to the associated end user.

As mentioned above, a media server can become a bottleneck if too many end user devices request media assets to be delivered by the media server concurrently. To address this situation, in one general aspect of the present invention, the saturation or availability of the media server is measured by sampling how many of the RAM-allocated buffers 26 contain data being transmitted to their associated end users at the time instance of their sampling, where all of the data buffers 26 are sampled over a relatively short time period. The number of non-empty buffers is used to generate a "saturation score" for the media server. This saturation score is indicative of a present available bandwidth of the data links of the media server and can be used to determine how to handle new socket requests for the media server 10. For example, the saturation score can be compared to some threshold saturation level for the media server. If the media server's saturation score is above the threshold, the media server can be considered saturated and appropriate action can be taken with respect to the media server, as described below. For example, an incoming socket request may be denied since the media server is saturated. Other possible responses are described below. This process can be repeated in cycles (referred to herein as "scoring cycles") so that new socket requests can be routed based on the media server's most up-to-date saturation score. The duration of the scoring cycle can be adapted based on the expected velocity of change in user numbers (e.g., scoring cycle is shortened when velocity increases), and ordinarily is on the order of five to fifty seconds, for example.

Figure 2:
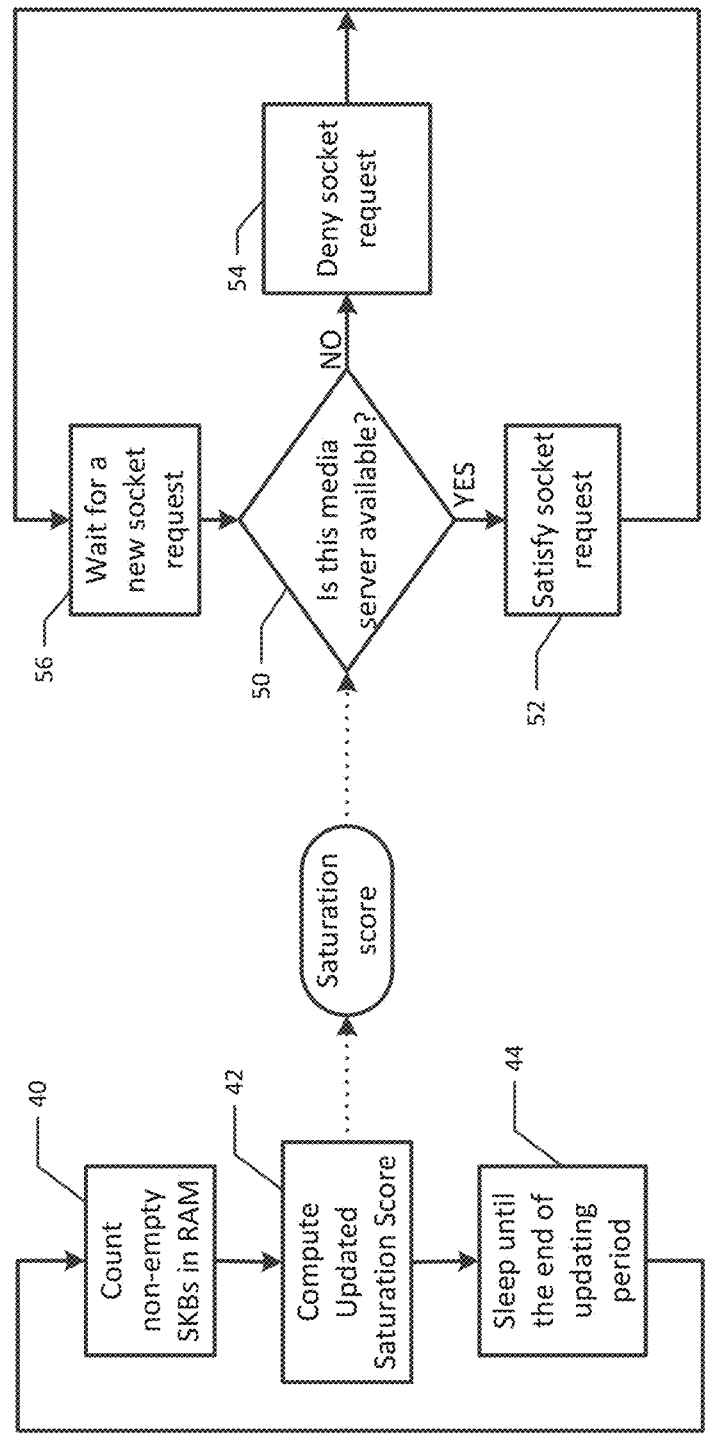
FIG. 2 is flow chart of a process for determining the availability of the media server of FIG. 1 according to various embodiments of the present invention.

FIG. 2 is a diagram of a process flow to determine the saturation score of the media server 10 and assess its availability for new socket request. The left-hand side of the process in FIG. 2 generally corresponds to determination of the media server's saturation score, which is used in the steps on the right-hand side of FIG. 2 to determine how to handle new socket requests for the media server. The steps on the right-hand side are generally referred to herein as "traffic management." The process of FIG. 2 can be executed by the processor(s) 22 of the media server 10, in which case the media server 10 itself determines its saturation level and performs the traffic management. In other variations described below, a remote traffic management server 30 (having a processor(s) 32 and associated memory 34) that is in communication with the media server 10, such as via a LAN or other data network 36, may receive the saturation score from the media server 10, and the remote traffic management server 30 determines where new socket requests should be routed based on the media server's saturation score at the time of the new socket request.

A new socket request at step 56 is an example of a new request for media content, when the user 12 and the server 10 uses a connection oriented protocol such as TCP for example. Generally, the new request for media content can be an HTTP request for a chunk of the media content, a DNS request, or any similar routable request.

Figure 3:
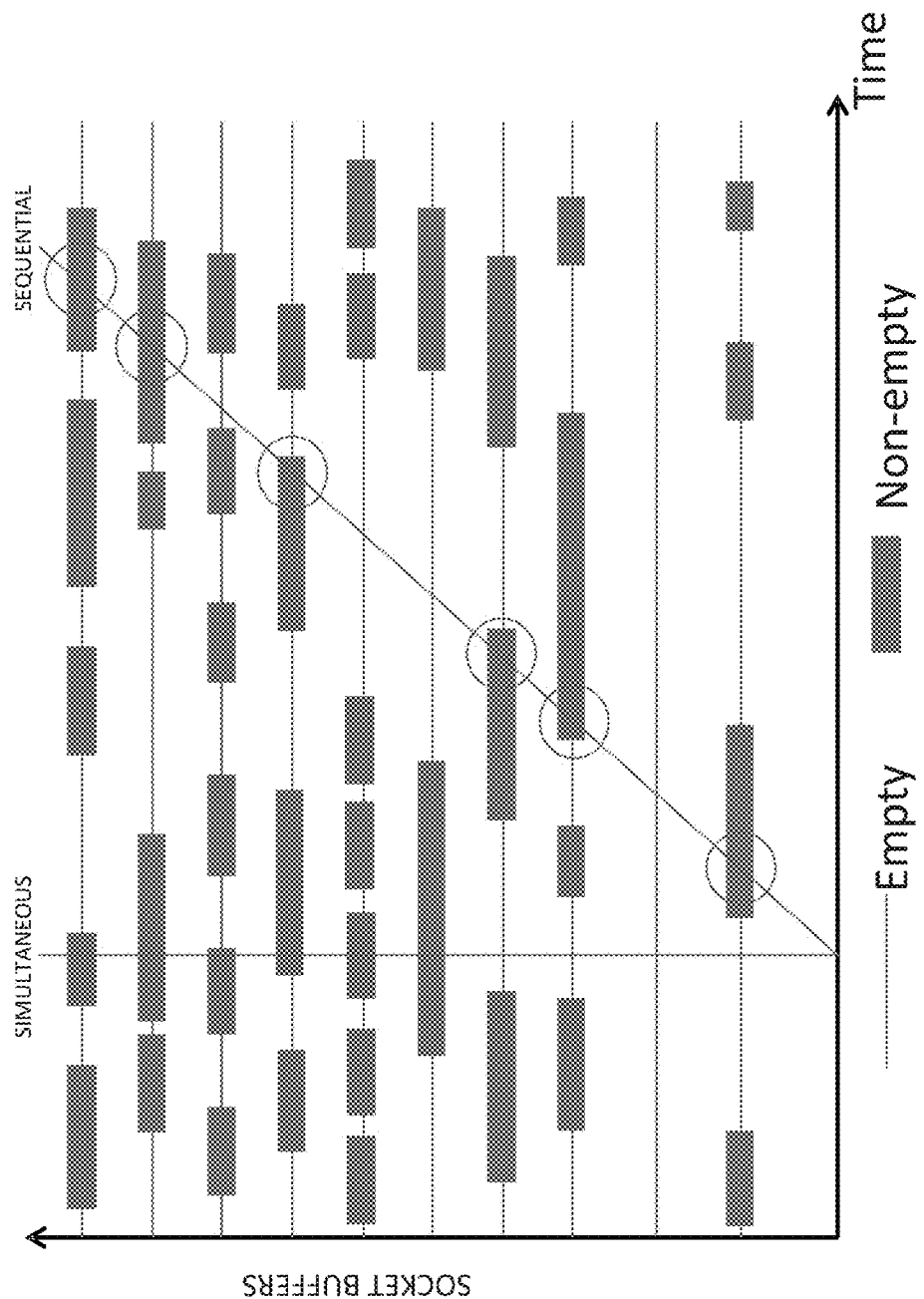
FIG. 3 is a timing diagram illustrating sampling of the data buffers of the media server of FIG. 1 according to various embodiments of the present invention.

At step 40, the processor 22 counts the number of non-empty buffers 26 in the RAM 24. For example, in a Linux system, the processor 22 can make an API call to the kernel to ascertain the status of the individual buffers. The buffers 26 can be sampled sequentially by the processor 22, with the status of each buffer (i.e., whether it is empty or not) determined at the time instant the buffer was sampled ("the sampling instant"). Because the buffers 26 are independent of each other, sequential sampling will yield statistically equivalent results as if all of the buffers were sampled simultaneously. FIG. 3 illustrates this concept with ten concurrent network sockets, although in practice the media server 10 can have thousands at one time. The status of the buffers for each socket over time is shown as the horizontal lines. Buffers that are non-empty (and transmitting data) at a particular time are shown with a thick line and empty buffers are shown with thin lines. Simultaneous sampling of the buffers yields in this example a count of six concurrently non-empty buffers, which is the same count for the sequential count shown in FIG. 3.

In practice, simultaneous and sequential sampling can yield slightly different counts. The difference is explained by the stochastic nature of adaptive bitrate media delivery and, for the purpose of this invention, insignificant. In fact, any arbitrary counting trajectory (line crossing all socket buffers in FIG. 3) will do. It is also conceivable that some implementations will report an instantaneous count of non-empty socket buffers, thus yielding the result of simultaneous sampling described above.

Returning to FIG. 2, following step 40, at step 42, the processor 22 computes the saturation score for the media server 10 based on the number of buffers 26 that were non-empty at the times the buffers were sequentially sampled (collectively, the "sampling instances"). The saturation score, in various embodiments, could be the raw count of non-empty buffers produced at step 40. As an example, assuming a media server has a network interface card capable of 10 Gbps and the desired bandwidth guarantee per user is 5 Mbps, then in that case the media server can have 2000 concurrent transmissions (10,000÷5), so 2000 can be the threshold saturation score in this example for the media server, where the saturations score is computed as the raw count of non-empty buffers. In other embodiments, the raw count of non-empty buffers can be used in conjunction with other performance metrics of the media server in computing the media server's saturation score to account for the fact that the network interface capability may not be the media server's only bottleneck. For example, the CPU load and/or the storage-RAM bandwidth could also be bottlenecks. In such embodiments, therefore, the media server's saturation score may additionally account for these other factors (in addition to the raw count of non-empty buffers) to determine the media server's saturation score. For example, assume the media server has 8 CPU cores, such that 8 is the threshold for the CPU load. The kernel can sample execution threads to determine an average number of them in "runnable" state (e.g., "load average" for a Linux server). If there are 4 threads ready for execution on average over the sampling time period, the server will be deemed to be 50% saturated in terms of the CPU load. The CPU saturation score can be 4 (or 50%) in this example, with the threshold being 8 (or 100%). Also, as to storage-RAM bandwidth, pulling content from storage 20 (even fast local SSD) to the RAM 26 for transmission may be slower than the network, so access to storage can become a bottleneck. This can be accounted for by, for example, using a saturation score for the storage-RAM bandwidth that can be defined as the number of bytes read from the storage (as reported by kernel) over a certain time period related to this period. The media server's overall saturation score can be the minimum, maximum, average, or some other combination of these three scores (i.e., the raw non-empty buffer count, the CPU load score, and the storage-RAM throughput) or a subset of them (including the raw non-empty buffer count), preferably normalized (e.g., expressed as a percent). As such, the media server's saturation score is computed based on the raw non-empty buffer count. As indicated by block 44, the saturation score can be computed periodically in this manner by repeating the process every scoring cycle. In that way, the saturation level of the media server is continuously updated every scoring cycle.

The right side of FIG. 2 shows that the updated saturation score can be used to determine how to handle new socket requests for the media server 10. For example, at step 50 the processor 22 (or the processor 32 of traffic management server 30) can determine whether the media server 10 allows more sockets. This determination can be performed, for example, by comparing the saturation score to a saturation score threshold for the media server. Each media server can have its own threshold saturation score. If the saturation score is below the threshold, the media server can be available for more users, as indicated by block 52, wherein the media server is likely to handle a new socket request (subject to other traffic management considerations). On the other hand, if the saturation score is at or above the threshold level, at block 54 a new socket request to the media server 10 can be denied so as to not deleteriously affect its QoS level. As indicated by block 56, any new socket requests can be dispatched based on the updated saturation score at the time of the request.

In various embodiments of a media server, data of the media content may pass through many buffers in RAM before transmission to the user(s). For example, the data of media content may be first stored in a kernel buffer associated with the storage system 20 (see FIG. 1), then copied to an application (e.g. web server) buffer, then copied to a socket send buffer 26 (also in kernel space), and then sent to a physical data link 25. In various embodiments, the data buffers that are sampled are the last buffer in the chain before transmission over the physical data link 25, e.g., the socket send buffers 26 in the above example. As such, the data buffers that are sampled are the data buffers that store data for sending to the data links, i.e., without the data being copied to any other buffer in the media server's RAM before transmission.

Figure 4:
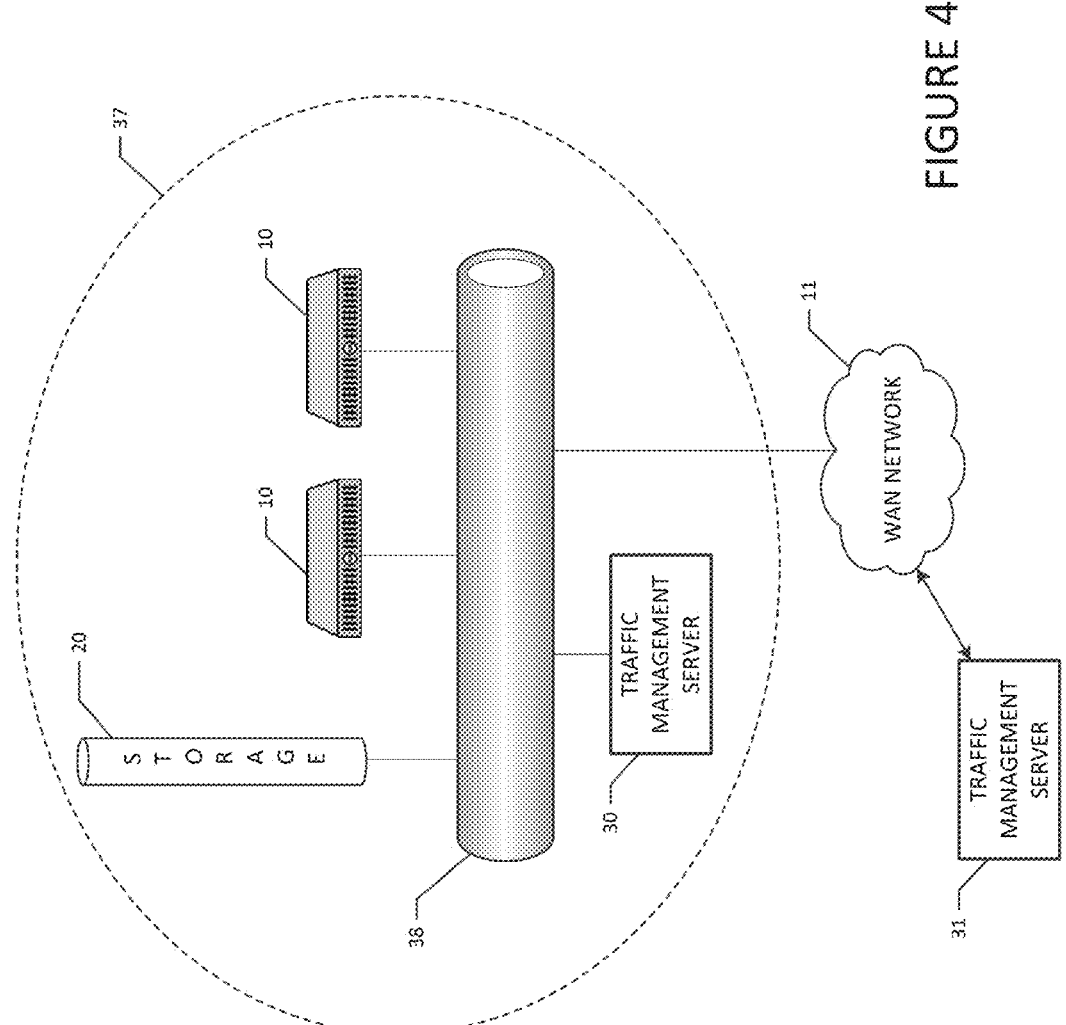
FIGS. 4 to 6 are block diagrams of apparatuses comprising a media server whose saturation level is determined according to various embodiments of the present invention.

In the exemplary embodiment of FIG. 1, the media server's processor(s) 22 and/or the traffic management server's processor(s) 32 are programmed to execute the process shown in FIG. 2 by executing software stored in memory of the media server 10, such as the RAM 24 or some other memory unit, or the memory 34 of the traffic management server 30, as the case may be. In other embodiments, as shown in the example of FIG. 4, multiple media servers 10 can be grouped in a cluster (or battery, or array) 37, such as via a LAN 38 or some other network configuration (only two media servers 10 are shown in FIG. 4 for illustration purposes, but the cluster 37 could have many additional media servers). The media servers 10 are also connected to the network 11 (WAN or Internet) to serve media content to end users (i.e., requestors of the media assets). In such a cluster configuration, each media server 10 can compute its saturation score (such as according to the process described above in connection with FIG. 2) and share its updated saturation score with the other media servers in the cluster 37 via the network 38. That way, each media server 10 in the cluster 37 knows the updated saturation scores for each of the other media servers 10 in the cluster 37. Also, each media server in the cluster 37 can be programmed to know the capacity (e.g., threshold saturation score) for each media server 10 in the cluster 37, since the thresholds may not be the same for each media server 10. That way, when one of the media servers 10 in the cluster 37 receives a new socket request, it can accept that request itself (see e.g., step 52 of FIG. 2) or it can route the new socket request to another media server 10 in the cluster 37, preferably one whose saturation score at the time of the new socket request is below the threshold for that media server. Further, if a nonsaturated media server 10 needs to direct a user to another server in the cluster for reasons unrelated to saturation level, the media server 10 can direct the user to a nonsaturated media server in the same manner.

In another variation, also depicted in connection with FIG. 4, the media servers 10 in the cluster 37 could report their saturation scores, via the LAN 38, to the traffic management server 30A that is connected to the LAN 38 (and hence the media servers in the cluster 37). In such a configuration, the traffic management server 30A can route new socket requests to the appropriate media server 10 in the cluster 37 based on the updated saturation scores for the media servers. Also, in another similar arrangement, the traffic management server could be connected to the network 11, such as the traffic management server 30B shown in FIG. 4.

In various embodiments, new socket requests can be routed to available media servers in a non-deterministic (e.g., probabilistic) manner (regardless of which machine does the routing, such as the individual media servers or a traffic management server). In such embodiments, for example, the closer the saturation score for a media server is to its threshold, the less likely new socket requests are routed to that media server. New users instead can be directed to less saturated (more available) media servers. This way, system overload (when minimal bandwidth per user at the media server side cannot be guaranteed) occurs for all media servers of the system/cluster simultaneously, and QoS degradation happens to all users of the system evenly. This is different from the grant-deny model, where first-come-first-served users have minimal bandwidth per user guarantee and all new users are rejected after all saturation thresholds are reached.

Figure 5:
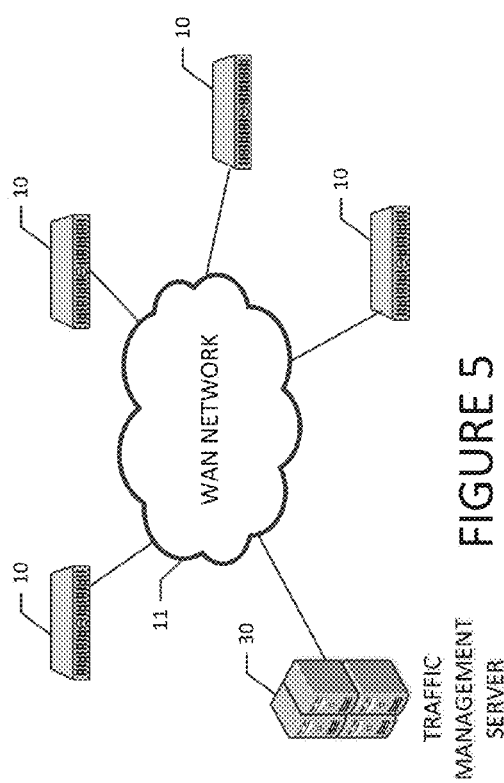

In another configuration that is within the scope of the present invention, a number of media servers 10 could be connected to a WAN 11 and scattered over a geographic region (e.g., the entire globe or a smaller geographic region), as shown in the example of FIG. 5. In this configuration, each media server 10 can periodically or from time-to-time report its saturation level via the network 11 to the traffic management server(s) (TMS) 30 that covers the geographic region and/or a particular type of end users and/or a specific type of service. The TMS 30 can analyze a number of metrics in determining where to direct new users/socket requests, including but not limited to the media servers' respective saturation levels. Based on that analysis, the TMS 30 can steer new users towards media servers 10 in the network in such a way that the QoS and, eventually, the quality of user experience, are increased or maximized. The process of "steering" can be based on Domain Name System (DNS lookups), Border Gateway Protocol (BGP anycast), HTTP redirects, IPv6 redirects, and a combination of these or any other methodology.

Figure 6:
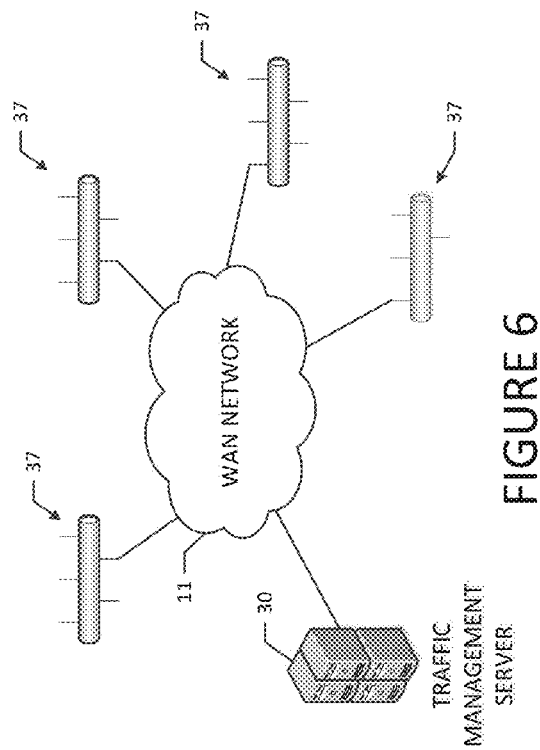

Another possible setting is a combination (i.e., a superposition) of the prior two described settings, as shown in FIG. 6, in which the clusters 37 are connected to the WAN 11 and scattered over a geographic region. In this configuration, each cluster can report its average saturation level (e.g., the average of the saturation levels of the media servers 10 in the cluster 37) to the TMS 30 that can implement steering logic to route new users/socket requests to the appropriate cluster 37 based on, among other things, the clusters' average saturation levels. The clusters 37 can then route the new socket request to the appropriate media server 10 in that cluster. In such embodiments, each media server 10 in a particular cluster 37 can report its saturation level and/or the saturation levels of the other media servers in the cluster 37 to the TMS 30, which can then compute the average for the cluster; or each media server 10 in the cluster 37 can compute and report the average for the cluster to the TMS 30 (since each media server in the cluster 37 can know the saturation levels of the other media servers in the cluster 37).

Yet another possibility is the setting described in the previous paragraph, wherein machines of a cluster 37 share the same physical network WAN 11 (FIG. 6).

In any of the above described configurations, whether the saturation level of a given media server is at or above its threshold level does not have to be deterministic of whether new socket requests are conveyed to that media server. Instead, the respective media servers' saturation levels can be one factor that is considered in routing a new user/socket request. For example, consider two media servers, each having a saturation threshold of 100 in order to guarantee minimal bandwidth per user at server side. Further assume that the steering logic takes into account saturation as well as other metrics, e.g. which server is closer to the user or the content type being requested. Suppose, at a given point in time the first media server is saturated by 80 (has 20% of free capacity) and the second by 60 (has 40% of free capacity). When the next user request comes through, and all other steering metrics but saturation are equal, the probability of this request going to the second server could be twice as high as the probability of this request going to the first server. This way the saturation is accounted for but does not necessarily determine to which server the request is routed, thus letting other metrics contribute to the steering logic. Furthermore, if each server is overloaded (free capacities 0% for both), new user requests can still be dispatched, in various embodiments, to either of the servers in accordance with other steering logic metrics, recognizing that the guarantee of the bandwidth is broken at this point.

In one general aspect, therefore, the present invention is directed to systems and methods for measuring availability of a media server 10 that transmits media content to a plurality of users 12 via data links 25 of the media server. The method can comprise the step of sampling the plurality of data buffers 26 (e.g., send socket buffers), each at a sampling time instant (e.g. sequentially, as shown in FIG. 3, or simultaneously), to determine whether the data buffers contain data being transmitted at the sampling time instances (the times the data buffers are sampled, which can be different time when sampling is sequential). Each data buffer 26 is associated with one of the plurality of users and the data are stored in the data buffers for sending to the data links. The method further comprises the step of calculating a saturation score for the media server, based on the sampling, that is indicative of a number of the data buffers containing data being transmitted via the data links at the sampling time instances (the time instances that the respective data buffers are sampled). The method further comprises the step of evaluating the saturation score against a threshold saturation score for the media server, where the relationship between the scores indicates availability of the media server for additional media transmissions. For example, in one embodiment, if the media server's saturation score is less than the threshold, a new socket request can be accepted by the media server.

In various implementations, the steps of this method are repeated cyclically and are performed by one or more processors, such as the processor 22 and possibly in combination with other processors (e.g., a processor 32 of the traffic management server 30). For example, a processor of the media server 10 can calculate the saturation score and a processor of the traffic management server 30 can evaluate the saturation score against the threshold score.

A system (or apparatus) of the present invention can comprise a RAM 24 of a media server 10 and one or more processors (e.g., processor(s) 22). A plurality of data buffers 26 are allocated in the RAM 24, with each data buffer being associated with one of a plurality of users 12 to which media content is being transmitted from the media server 10 via data links 25 of the media server to a computer data network 11. The one or more processors execute software which causes the one or more processors to: (i) sample the plurality of data buffers 26 each at a sampling time instant to determine whether the data buffers contain data being transmitted at the sampling time instances; (ii) calculate a saturation score for the media server based on the sampling, where the saturation score is indicative of a number of the data buffers containing data being transmitted via the data links at the sampling time instances; and (iii) evaluate the saturation score against a threshold saturation score for the media server, wherein the relationship between the scores indicates availability of the media server for additional media transmissions.

In another general aspect, a system or apparatus according to the present invention comprises a first media server 10 and a traffic management server 30. The first media server comprises a random access memory (RAM) 24 and one or more processors 22. As before, a plurality of data buffers 26 (e.g., send socket buffers) are allocated in the RAM 24, where each data buffer 26 is associated with one of a plurality of users 12 to which media content is being transmitted from the media server via data links of the media server, and data of the media content are stored in the data buffers for sending to the data links 25. The processor(s) (i) sample the plurality of data buffers each at a sampling time instant to determine whether the data buffers contain data of the media content being transmitted at the sampling time instances; and (ii) calculate a saturation score based on the sampling, wherein the saturation score is indicative of a number of the data buffers containing data being transmitted via the data links at the sampling time instances.

The traffic management server 30 is connected to the first media server 10 via a first computer data network (e.g. networks 38 or 11). The traffic management server (i) receives saturation score data via the first computer data network that is based on the saturation score of the first media server; and (ii) routes a new socket request for the media based on the saturation score data. The first media server can be one of many media servers in a cluster (see FIGS. 4 and 6) and the "saturation score data" can be the average saturation score for the media servers in the cluster.

The computer devices described herein, e.g., the media servers 10 and the TMS 30, may comprise one or more, preferably multi-core, microprocessors and one or more memory units. The memory units may comprise software or instructions that are executed by the microprocessor(s). The memory units that store the software/instructions that are executed by the processor may comprise primary computer memory, such as RAM and ROM, and secondary computer memory, such as hard disk drives and solid state drives. The memory units may comprise software that when executed by the processor(s) of the computer devices perform the functions programmed by the software, such as streaming the media assets to the users, sampling the data buffers, calculating the saturation levels, comparing the computed saturation level to a threshold, and routing incoming socket requests based on the saturation levels. In particular, the above-described computer devices may be implemented as one or a number of networked computer servers.

The software or computer programs, such as the code for sampling the data buffers described above (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of measuring availability of a media server that transmits media content to a plurality of users via data links of the media server, the method comprising:
   sampling, by one or more processors, a plurality of data buffers allocated in a random access memory (RAM) of the media server, each at a sampling time instant, to determine whether the data buffers contain data being transmitted at the sampling time instances, wherein each data buffer is associated with one of the plurality of users and the data are stored in the data buffers for sending to the data links;
   calculating, by the one or more processors, a saturation score based on the sampling, wherein the saturation score is indicative of a number of the data buffers containing data being transmitted at the sampling time instances; and
   evaluating, by the one or more processors, the saturation score against a threshold saturation score for the media server, wherein the relationship between the scores indicates availability of the media server.

2. The method of claim 1, wherein the steps of sampling, calculating, and evaluating are repeated cyclically.

3. The method of claim 1, wherein the one or more processors comprise one or more processors of the media server.

4. The method of claim 1, wherein the one or more processors comprise:
   at least one processor of the media server that calculates the saturation score; and
   at least one processor of a traffic management server that is in communication with the media server, wherein the at least one processor of the traffic management server evaluates the saturation score against the threshold score.

5. The method of claim 1, wherein sampling the plurality of data buffers comprises sampling the plurality of data buffers sequentially each at a different time instant.

6. The method of claim 1, wherein the sampling the plurality of data buffers comprises sampling the plurality of data buffers simultaneously.

7. The method of claim 1, wherein the data buffers comprise socket send buffers allocated in the RAM of the media server.

8. The method of claim 1, further comprising routing, by the one or more processors, a new request for media content to the media server, wherein the saturation score of the media server is a basis for the routing.

9. An apparatus comprising:
   a media server comprising a random access memory (RAM), wherein a plurality of data buffers is allocated in the RAM, wherein each data buffer is associated with one of a plurality of users to which media content is being transmitted from the media server via data links of the media server, and data of the media content are stored in the data buffers for sending to the data links;
   one or more processors in communication with the RAM, wherein the one or more processors execute software which causes the one or more processors to:
   sample the plurality of data buffers, each at a sampling time instant, to determine whether the data buffers contain data being transmitted at the sampling time instances;
   calculate a saturation score based on the sampling, wherein the saturation score is indicative of a number of the data buffers containing data being transmitted at the sampling time instances; and
   evaluate the saturation score against a threshold saturation score for the media server, wherein the relationship between the scores indicates availability of the media server.

10. The apparatus of claim 9, wherein the media server comprises one or more network adapters connecting the media server to the computer data network.

11. The apparatus of claim 9, further comprising a data storage system for storing the media content.

12. The apparatus of claim 11, wherein the data storage system is internal to the media server.

13. The apparatus of claim 11, wherein the data storage system is:
    external to the media server; and
    connected to a plurality of media servers that each transmits media stored in the data storage system to users.

14. The apparatus of claim 9, further comprising a traffic management server in communication with the media server via a computer data network, and wherein:
    the one or more processors comprises at least a first processor and a second processor;
    the media server comprises the first processor, and the first processor calculates the saturation score; and
    the traffic management server comprises the second processor, and the second processor evaluates the saturation score against a threshold saturation score.

15. The apparatus of claim 9, wherein the data buffers comprise socket send buffers allocated in the RAM of the media server.

16. The apparatus of claim 9, wherein the one or more processors are programmed to route a new request for media content to the media server, and the saturation score of the media server is a basis for the routing.

17. An apparatus comprising:
    a first media server that comprises:
      a random access memory (RAM), wherein a plurality of data buffers is allocated in the RAM, wherein each data buffer is associated with one of a plurality of users to which media content is being transmitted from the media server via data links of the media server, and data of the media content are stored in the data buffers for sending to the data links; and
      one or more processors in communication with the RAM, wherein the one or more processors execute software which causes the one or more processors to:
        sample the plurality of data buffers, each at a sampling time instant, to determine whether the data buffers contain data being transmitted at the sampling time instances; and
        calculate a saturation score based on the sampling, wherein the saturation score is indicative of a number of the data buffers containing data being transmitted at the sampling time instances; and
    a traffic management server connected to the first media server via a first computer data network, wherein the traffic management server:
      receives saturation score data based on the saturation score of the first media server via the first computer data network; and
      routes a new request for media content based on the saturation score data.

18. The apparatus of claim 17, wherein:
    the first media server is one of a plurality of media servers connected to a second computer data network, wherein each of the plurality of media servers comprises:

a random access memory (RAM), wherein a plurality of data buffers is allocated in the RAM, wherein each data buffer is associated with one of a plurality of users to which media content is being transmitted from the media server via data links of the media server, and data of the media content are stored in the data buffers for sending to the data links; and one or more processors in communication with the RAM, wherein the one or more processors execute software which causes the one or more processors to:

sample the plurality of data buffers, each at a sampling time instant, to determine whether the data buffers contain data being transmitted at the sampling time instances; and calculate a saturation score based on the sampling, wherein the saturation score is indicative of a number of the data buffers containing data being transmitted at the sampling time instances; and the traffic management server is connected to the first computer data network and routes the new request based on the average saturation score for the media servers connected to the second computer data network.

19. The apparatus of claim 17, wherein:

the first media server is one of a plurality of media servers connected to the first computer data network, wherein each of the plurality of media servers comprises:

a random access memory (RAM), wherein a plurality of data buffers is allocated in the RAM, wherein each data buffer is associated with one of a plurality of users to which media content is being transmitted from the media server via data links of the media server, and data of the media content are stored in the data buffers for sending to the data links; and one or more processors in communication with the RAM, wherein the one or more processors execute software which causes the one or more processors to:

sample the plurality of data buffers, each at a sampling time instant, to determine whether the data buffers contain data being transmitted at the sampling time instances; and calculate a saturation score based on the sampling, wherein the saturation score is indicative of a number of the data buffers containing data being transmitted at the sampling time instances; and the traffic management server routes the new request based on the average saturation score for the media servers connected to the first computer data network.

* * * * *